United States Patent Office 3,343,162
Patented Sept. 19, 1967

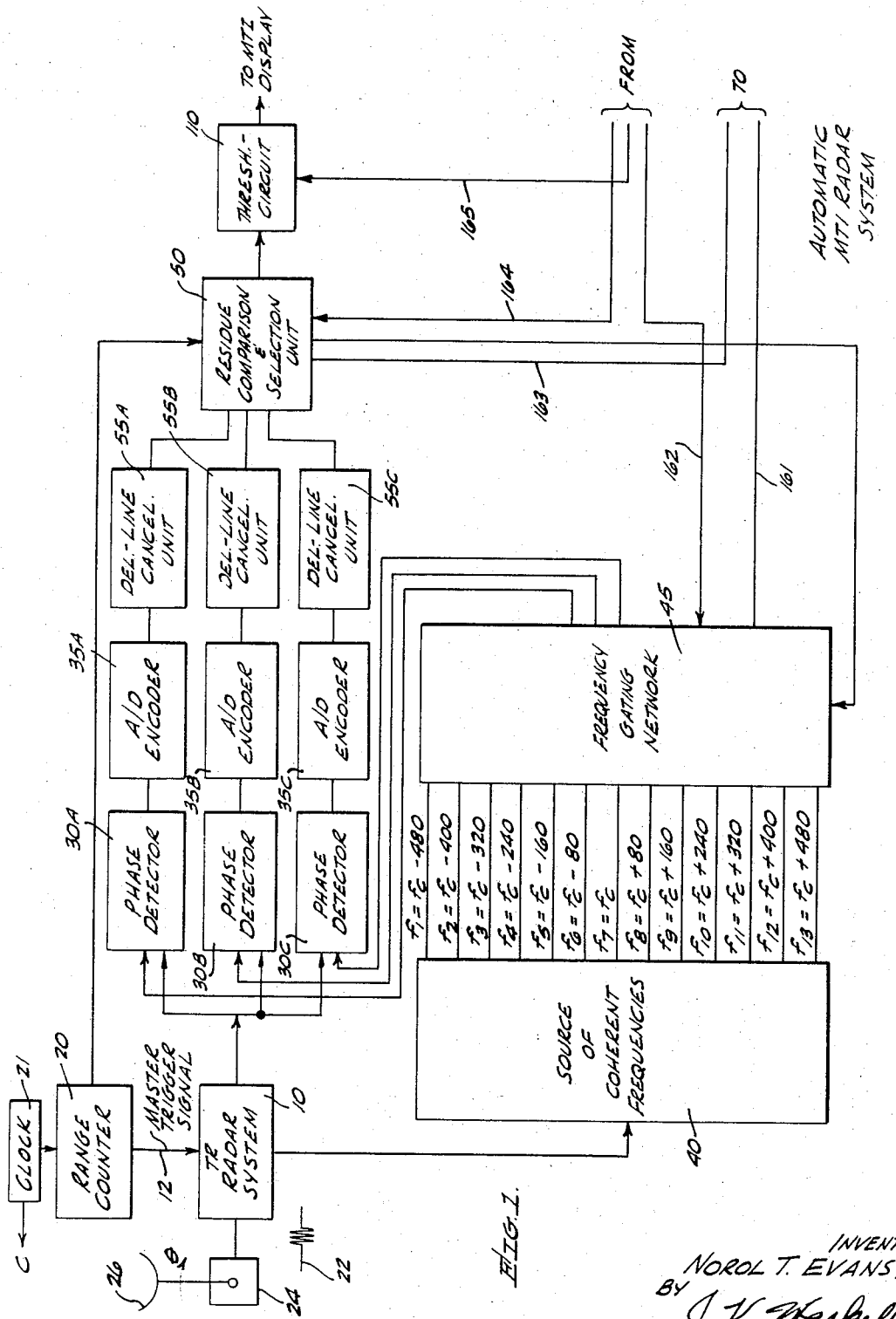

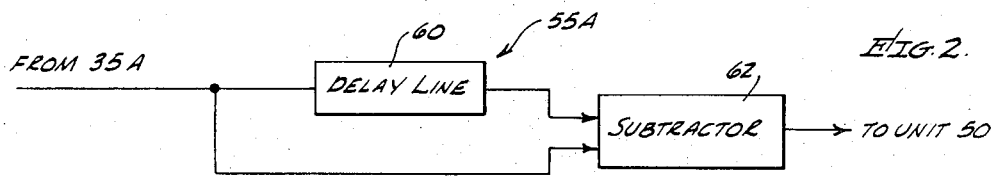
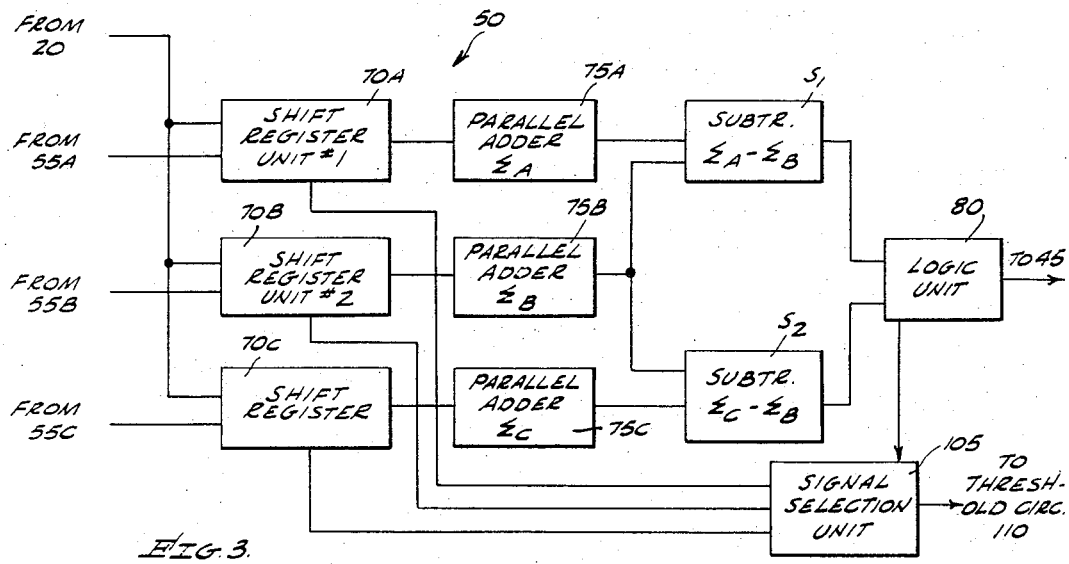

3,343,162
CLUTTER CANCELLING SYSTEM
Norol T. Evans, San Pedro, Calif., assignor to Hughes Aircraft Company, Culver City, Calif., a corporation of Delaware
Filed Feb. 2, 1966, Ser. No. 524,394
11 Claims. (Cl. 343—7.7)

ABSTRACT OF THE DISCLOSURE

A moving clutter tracking system which generates signals at a plurality of reference frequencies both above and below zero Doppler frequency. IF video is applied to three phase detectors to which three selected adjacent reference frequencies are also applied. The detector output signals of the three phase detectors are applied in digital form to separate cancellation stages. The magnitudes of the cancellation stages outputs are compared with each other to control application of different adjacent reference frequencies to the three phase detectors until the magnitude of the signal developed by a predetermined one of the three cancellation stages is at a minimum value.

---

Figure 5:
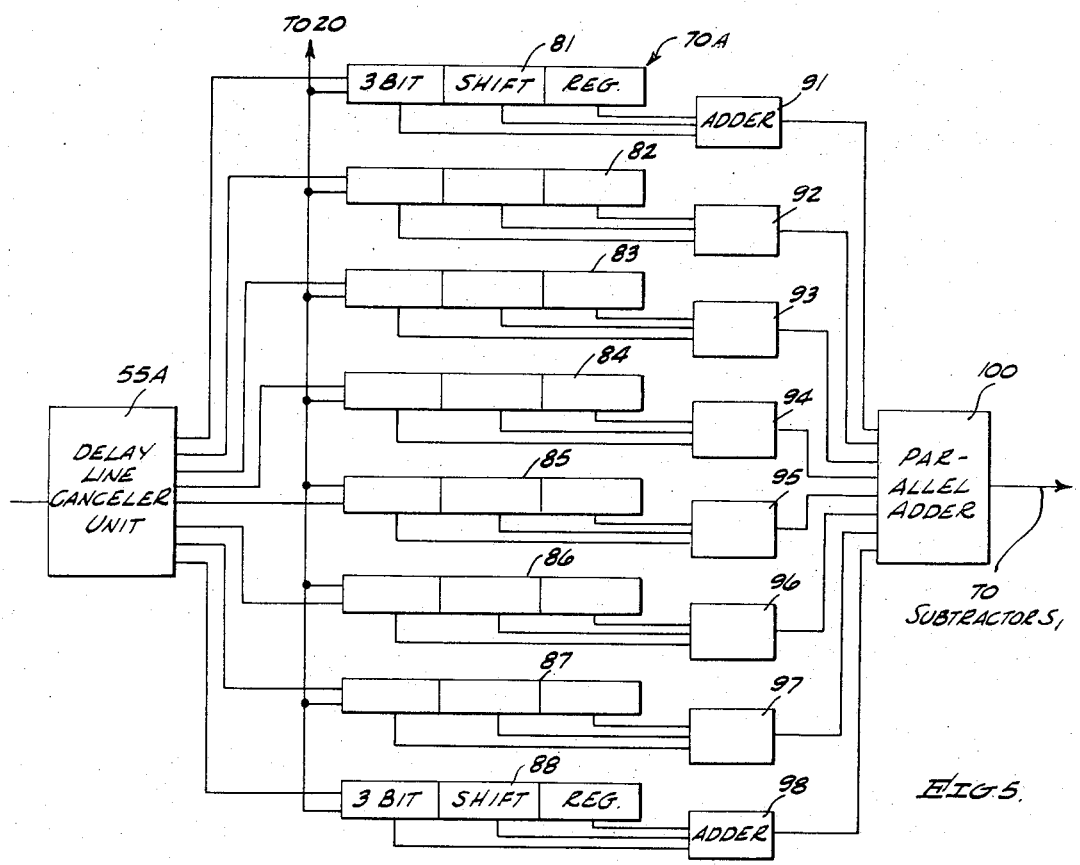

This invention relates to a radar system and more particularly to a system for automatically tracking clutter in a moving target indicator cancellation system.

At present, various moving target indication radar systems are known for detecting moving targets by Doppler measurement techniques. These systems are generally referred to as MTI radar, sometimes also known as pulse Doppler radar since the Doppler information is extracted by pulse radar techniques. In "Introduction to Radar Systems" by Merril I. Skolnik, published by McGraw-Hill Book Company, Library of Congress Catalog card number 61-17675, Chapter 4, which is entitled MTI and Pulse-Doppler Radar, contains a summary of such systems and their applications.

As pointed out in the above referred to reference, MTI radar can extract the echo of a moving target from the echo of clutter even if the clutter echo is many fold greater in amplitude than the moving target echo. Some pulse Doppler radars detect moving targets even when the clutter echo is 70 to 90 decibels (db) greater than the target echo. Conventionally, clutter is assumed to be stationary so that echoes therefrom are cancelled and thereby distinguished from echoes of targets of interest. However clutter is not necessarily stationary. For example, cloud formations which may provide radar echoes are in constant motion.

In fully automatic MTI radar, in which target indicating signals are automatically produced, it is necessary to effectively cancel the effect of the moving clutter in order to minimize the number of false target indicating signals.

One technique which may be used to cancel the effect of moving clutter is to control the phase of the coherent oscillator, also known as coho, of the MTI radar to the leading edge of a clutter return or echo after a delay of one pulse width of the pulse repetition frequency (PRF). However such an arrangement in addition to requiring a great many filters at each range bin searched has certain basic disadvantages which often prevent the use of such a technique. One of the basic disadvantages is the fact that the leading edges of the clutter echoes are not always cancellable. Thus too many false target indicating signals may be produced which may not always be acceptable. Furthermore, low level clutter echoes are not easily lockable to the coho, thus preventing proper clutter cancellation or locking occurs on echo edges which are produced by ambient noise, modulating the clutter echo which results in erroneous clutter cancellation. Thus a need exists for a relatively simple system for tracking moving clutter and cancelling the effect thereof on an automatic MTI radar.

It is an object of the present invention to provide a novel clutter tracking system.

Another object is the provision of a moving clutter tracking and cancelling system for use in a moving target indicator (MTI) radar.

A further object is to provide a new moving clutter tracking system utilizing digital circuitry.

Still a further object is to provide a digital moving clutter moving tracking system in which the clutter Doppler frequency is sensed to derive the relative motion thereof.

Yet a further object is the provision of a relatively simple digital multistage cancellation MTI radar wherein moving clutter is tracked without sensing the leading edges of the echoes thereof and wherein timing and delay lines control problems are greatly minimized.

These and other objects of the invention are accomplished by generating a plurality of frequencies each differing from the other by a predetermined number of c.p.s. Half the frequencies are above a frequency representing zero Doppler frequency while the other half are below the zero Doppler. A sample of the radar transmitted pulse is used to control the frequencies to be phase coherent with the transmitted frequency.

The intermediate frequency (IF) signal of the received echoes in the MTI radar, hereafter also referred to as IF video, is fed to three identical phase detectors. Also three adjacent frequencies of the plurality of frequencies are selectively supplied to the three phase detectors. The output of each detector is a function of the IF from the MTI radar and the particular frequency selectively supplied thereto. The analog outputs of the three detectors are digitized in three A to D encoders and therefrom supplied to a first digital cancellation stage which operates in a manner similar to an analog cancellation stage except that it processes digital information. The magnitudes of the cancellation stages outputs are compared with one another. In response to such comparisons, different three adjacent frequencies are supplied to the three phase detectors until the magnitude of a particular one of the three cancellation stages is the lowest, thereby indicating the minimization of the affect of moving clutter on the IF video.

Figure 6:
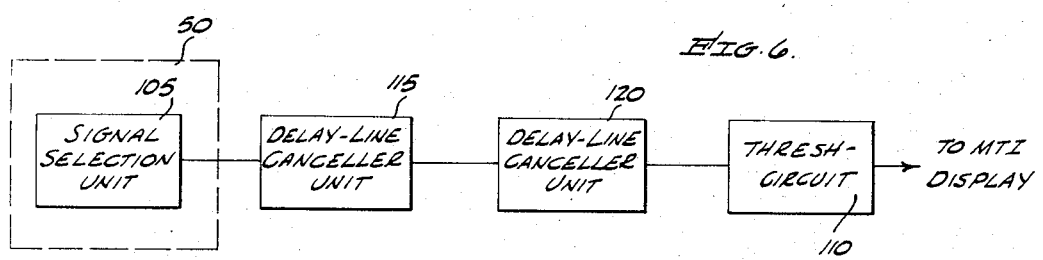
Figure 8:
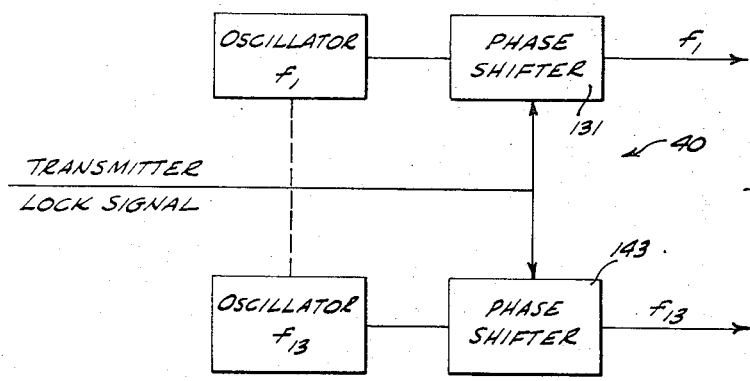
Figure 7:
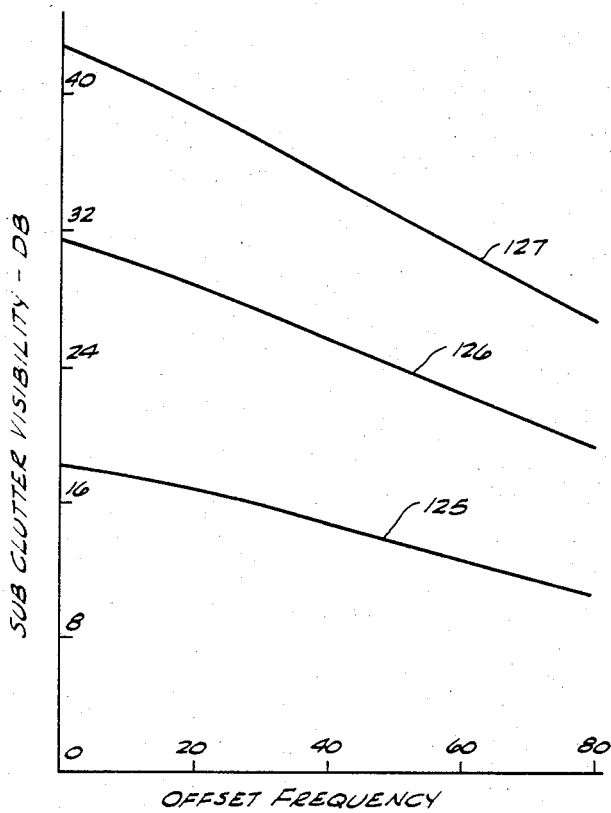
Figure 9:
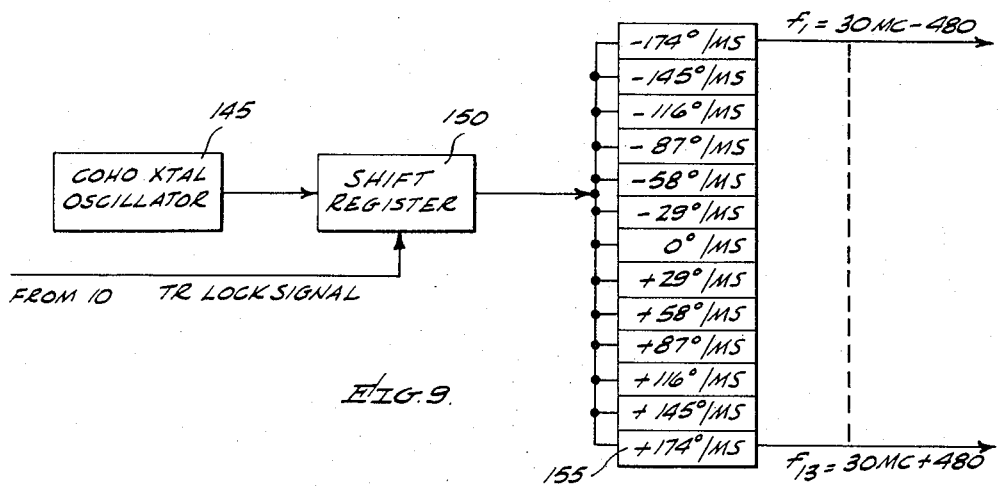

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is an overall block diagram of the novel system of the present invention;
FIGURE 2 is a simplified block diagram of a delay line canceler;
FIGURE 3 is a diagram of the residue comparison and selection unit, shown in FIGURE 1;
FIGURE 4 is a truth chart of the logic operation of circuitry shown in FIGURE 3;
FIGURE 5 is an expanded block diagram of the circuitry shown in FIGURE 3;
FIGURE 6 is a partial block diagram of another embodiment of the invention, using more than one delay line canceler unit;
FIGURE 7 is a diagram displaying the system's relative subclutter visibility as a function of the number of delay line canceler units incorporated in the system of the present invention; and
FIGURES 8 and 9 are block diagrams of two different embodiments of the source of coherent frequencies 40, shown in FIGURE 1.

Attention is now directed to FIGURE 1 which is a block diagram of the system of the present invention shown coupled to a transmitter receiver (TR) radar system 10 which is synchronized by a master trigger signal supplied thereto by line 12 from a master range counter 20, which is in turn triggered by clock pulses C from a clock 21.

Pulses of energy of a waveform 22 are applied to an antenna system 24 which is shown including a surveillance antenna 26 rotating in a horizontal plane. The energy pulses transmitted into space by the antenna 26 and intercepted thereby after being reflected from objects such as targets are supplied to the receiver portion of radar system 10, wherein the pulses are mixed in a conventional manner to develop intermediate frequency video return signals, referred to in the art as IF video signals. The antenna 26 is assumed to rotate at a relatively slow rate so that a pulse is transmitted and its reflections received effectively at incremental positions of an azimuth angle $\theta$. The frequency of such signals can be analyzed with respect to a reference frequency such as is provided by a coherent frequency oscillator or coho used in forming the transmitted energy pulses to detect moving targets by sensing the changes in the IF video signals due to the Doppler frequency shifts introduced by the moving targets. Such frequency comparisons are generally performed in phase detectors, the outputs of which are functions of the frequency differences of two coherent frequencies supplied thereto.

In accordance with the teachings of the present invention, the IF video signals derived in TR radar system 10 are supplied to phase detectors 30A, 30B and 30C, the outputs of which are connected to analog-to-digital (A/D) encoders 35A, 35B and 35C respectively. The system also includes a source of coherent frequencies 40 which is phase locked with the coho oscillator (not shown) in TR radar system 10 to provide a plurality of coherent frequencies. In FIGURE 1, source 40 is shown to provide 13 coherent frequencies $f_1$ through $f_{13}$. Assuming that the IF video signal, in the absence of a moving target, is $f_c$ which represents the coho's frequency, frequency $f_7$ is made equal to $f_c$ while frequencies $f_1$ through $f_6$ and $f_8$ through $f_{13}$ differ from $f_c$ by fixed increments, shown in FIGURE 1 to be 80 cycles. Thus, $f_1 = f_c - 480$ c.p.s., while $f_{13} = f_c + 480$ c.p.s., with the other frequencies varying therebetween in increments of 80 cycles. The frequency increment of 80 cycles represents a velocity of approximately 8 knots at the S band frequency. The number of frequencies is limited to 13, it being assumed that the clutter velocity relative to the radar is less than ±52 knots.

The clutter spectrum frequency is equal to 40 cycles per second. It should be appreciated that the fixed frequency increments and the number of coherent frequencies generated may be varied to track clutter of any assumed velocity at any desired spectrum.

As seen from FIGURE 1, the frequencies are supplied to a frequency gating network 45 which selectively supplies three adjacent frequencies to the three phase detectors 30A, 30B and 30C. The network 45 is controlled by a residue comparison and selection unit 50, hereafter also referred to as the selection unit 50 which is connected to encoders 35A, 35B and 35C through delay line cancelers 55A, 55B and 55C respectively.

As is appreciated by those familiar with the art, a delay line canceler is in essence a filter used to eliminate the DC component of fixed targets and to pass the AC component of moving targets.

The video signal supplied to a delay line canceler is divided into two channels as seen in FIGURE 2, to which reference is made herein, which is a simplified block diagram of one of the cancelers of FIGURE 1, such as canceler 55A. One is a normal video channel. In the other, the video signal is delayed by a delay line 60 by a time equal to one pulse repetition period of the radar.

The outputs from the two channels are subtracted from one another in a subtracter circuit 62. Thus, fixed targets with unchanging amplitudes from pulse to pulse are cancelled on subtraction. However, the amplitudes of the moving target echoes are not constant from pulse to pulse, and subtraction results in an uncancelled residue.

In accordance with the teachings of the present invention, since the input to each of the cancelers is in digital form, each canceler is controlled to operate on digital rather than analog signals. Assuming that each of encoders 35A, 35B and 35C is an 8-bit encoder, each of the cancelers is assumed to operate and appropriately delay each of the bits supplied thereto.

Referring again to FIGURE 1, in light of the foregoing description, it is seen that the IF video signal from TR radar system 10 is supplied to detectors 30A, 30B and 30C with each detector also being supplied with one of the three frequencies from network 45. The phase detector supplied with a frequency closest related to the IF video signal from moving clutter will produce the smallest signal and therefore the output or residue of the canceler associated with such a detector will be the smallest. In operation, the residue selection unit continuously compares the residues from the three cancelers over a three range bit interval and in accordance therewith controls the frequency gating network 45 to select three adjacent frequencies so that the output of canceler 55B is the smallest, thereby cancelling the effect of the Doppler frequency produced by moving clutter.

The system of the present invention and the operation thereof can be conceptually regarded as three IF video channels A, B and C supplied with the same IF video signal but with three related variable reference signals. The channel provided with a reference frequency which is the closest to the IF video signal produced by moving clutter produces the smallest signal. Only when the output of the second channel B is the lowest in amplitude is a clear indication provided that the reference frequency supplied to the phase detector 30B the closest to the IF video signal of the moving clutter and thereby the effect of the moving clutter cancelled, since by substantially matching the clutter's IF video signal, the effect of its motion or velocity is minimized or cancelled.

Let us assume that the clutter moves at a velocity of 16 knots and therefore the IF video signal is $f_c - 160$ c.p.s. Let it further be assumed that $f_6$, $f_7$ and $f_8$ are supplied to detectors 30A, 30B and 30C. It is appreciated that since detector 30A is supplied with two frequencies ($f_c - 160$ and $f_c - 80$) which are closest to one another, its output will be the smallest in amplitude. The next smallest output will be from channel C since detector 30C is provided with two frequencies $f_c - 160$ and $f_c + 80$ which are separated by the largest number of cycles, i.e. 240 c.p.s. Upon sensing that the output of channel A is smaller than that of channel B, unit 50 causes network 45 to provide frequencies $f_5$, $f_6$ and $f_7$ to the three detectors. Again the output of channel A will be the smallest so that network 45 will again be energized to supply frequencies $f_4$, $f_5$ and $f_6$ to detectors 30A, 30B and 30C. Since $f_4$ and $f_6$ both differ from the clutter produced IF video signal of $f_c - 160$ by the same number of cycles, the outputs of detectors 30A and 30C will be substantially equal. On the other hand, since $f_5$ equaling $f_c - 160$ is the closest to the clutter IF ($f_c - 160$), the output of detector 30B, and therefore the output of channel B is a minimum, thus cancelling the Doppler frequency shift created by the moving clutter.

On the other hand, when the clutter's velocity causes the IF video signal to be greater than $f_c$, the network 45 is energized to supply the detectors with frequencies from $f_7$ through $f_{13}$ until the frequency supplied to the detector 30B of channel B is the closest to the clutter IF video signals.

Referring to FIGURE 3, there is shown in simplified block diagram form one embodiment of the residue selection unit 50. It comprises shift register units 70A, 70B and 70C each associated with its respective channel A, B and C to receive the residue per bit from cancelers 55A, 55B and 55C. Each unit is shifted at the range bit interval by pulses from counter 20 so that residue is successively stored in each unit. Assuming that the video signals in each channel is encoded into eight bits and that the comparison is performed over a three range bit interval, each shift register unit includes eight 3-bit shift registers as will be explained hereafter in conjunction with FIGURE 5.

The bits in the shift registers of units 70A, 70B and 70C are added in parallel adders 75A, 75B and 75C, each providing an 8-bit summation of the residue in its respective channel over the three range bit interval. The output of adder 75A, designated $\Sigma_A$ is supplied to a subtracter S1 while the output of adder 75C designated $\Sigma_C$ is supplied to a subtracter S2, with each subtracter being also provided with the output of adder 75B designated $\Sigma_B$.

The function of subtractor S1 is to compare $\Sigma_A$ and $\Sigma_B$ and provide a first signal such as binary 0 when $\Sigma_A$ is greater than $\Sigma_B$ and a binary 1 when $\Sigma_A$ is not greater. Similarly, S2 compares $\Sigma_C$ with $\Sigma_B$ and supplies a binary 0 output when $\Sigma_C$ is greater than $\Sigma_B$ and a binary 1 when $\Sigma_C$ is not greater. The outputs of S1 and S2 are supplied to a logic unit 80 which provides a two-bit code output which is a function of the inputs from S1 and S2.

FIGURE 4 to which reference is made herein is a truth table indicating the outputs of S1, S2 and unit 80 as a function of which of the three signals $\Sigma_A$, $\Sigma_B$ and $\Sigma_C$ is the smallest. In FIGURE 4, a plus (+) sign may be thought of as representing a binary 1 and a minus (−) sign a binary 0. As seen when $\Sigma_A$ is a minimum in which case $\Sigma_C$ will be the largest of the three signals, the outputs of S1 and S2 will be a binary 1 and a binary 0 respectively, and the 2-bit code output of unit 80 will therefore be a 1, 0. On the other hand, when $\Sigma_C$ is the smallest or a minimum and therefore $\Sigma_A$ the largest or maximum of the three signals, the outputs of S1 and S2 are a "0" and a "1" respectively so that the output of unit 80 is 0, 1. Only when $\Sigma_B$ is a minimum, namely when the frequency supplied to channel B is the closest to the moving clutter IF video signal, are the outputs of both S1 and S2 binary "1's" in which case the 2-bit code of unit 80 is a 1, 1.

The two bit code of unit 80 is used to control the frequency gating network 45 in selecting the three adjacent frequencies supplied to the phase detectors 30A, 30B and 30C. When the code is 1, 0 indicating that $\Sigma_A$ is the smallest signal, the gating network 45 is energized to supply higher numbered frequencies, while a code of 0, 1 causes network 45 to pass therethrough three adjacent frequencies of the lower numbered frequencies. Only when the code is 1, 1 is the network inhibited from altering the frequencies supplied to the three phase detectors. It should be appreciated that various digital gating circuits responsive to a two bit code may be employed to comprise the network 45 controlling the particular group of three frequencies selected from the 13 frequencies supplied by source 40 (FIGURE 1). Therefore, it is assumed that network 45 need not be described in greater detail.

Although in the foregoing description in conjunction with FIGURE 1, each delay line canceler unit such as unit 55A is shown having a single input line and a single output line since each encoder such as encoder 35A is assumed to be an 8-bit encoder, it should be appreciated that the input and output lines of each canceler unit represents eight lines, each for another of the eight bits. Also each of the delay line canceler units includes eight cancelers as shown in FIGURE 2, each for providing D.C. cancellation for another of the bits.

Reference is now made to FIGURE 5 which is a more detailed block diagram of one of the shift register units such as 70A and one of the parallel adders such as 75A shown in FIGURE 3. As herebefore assumed, each delay line canceler unit such as unit 55A provides cancellation of an eight bit code, the residue of which is supplied to eight shift registers 81 through 88 which form the shift register unit 70A. Since the residue comparison is made over a three range bin interval, each register is of three bits and is clocked by pulses or signals from range counter 20 (FIGURE 1) so that during each range bin period, residue is clocked into each shift register. Adders 91 through 98 respectively add the three bits in registers 81 through 88 with a parallel adder 100 adding in parallel the digital additions in adders 91 through 98. The output of adder 100 represents the signal $\Sigma_A$ herebefore referred to which is an 8-bit video residue of channel A. Shift register units 70B and 70C are similar to unit 70A and adders 75B and 75C are identical to adder 75A.

The residue comparison and selection unit 50, in addition to the circuits herebefore described also includes a signal selection unit, designated in FIGURE 3 by reference numeral 105. The function of unit 105 is to compare an 8-bit output from each of the shift register units 70A, 70B and 70C, and supply the smallest of the three to an output circuit such as threshold circuit 110 (FIGURE 1). For example the last bits of registers 81 through 88 (FIGURE 5) may be used to provide the 8-bit output of shift register unit 70A while the last bits of registers in units 70B and 70C may similarly be used to provide the other two 8-bit outputs. Various circuits are presently known in the art for selecting the smallest digital value of a plurality of signals. Circuit 110 may be set either manually or automatically to a given threshold level, which when exceeded by the signal from unit 105 indicates the presence of a moving target. Such presence is supplied to any conventional moving target indicator display as an output from the threshold circuit.

In another embodiment of the present invention, the subclutter visibility of the system, i.e. the ability to provide a meaningful signal indicative of a moving target even in the presence of moving clutter which produces a signal many times the amplitude of the moving target signal, may be increased by utilizing additional cancelers between unit 105 and the threshold circuit 110. As seen in FIGURE 6 to which reference is made herein, two delay line canceler units 115 and 120 are shown serially connected between signal selection unit 105 of residue unit 50 and the threshold circuit 110. Each canceler contributes to increased subclutter visibility by further minimizing the effect of stationary targets or the slow moving clutter on the output signal, thereby further enhancing the signal produced by a moving target.

Attention is now directed to FIGURE 7 which is a diagram in which subclutter visibility in db is plotted with respect to clutter offset frequency with a clutter spectrum sigma equaling 40 cycles. Lines 125, 126 and 127 represent the subclutter visibility when one, two or three delay line canceler units respectively are utilized. As seen from the figure, with three canceler units (line 127) and zero offset frequency, i.e. the frequency supplied to phase detector 30B (FIGURE 1) is identical with the IF video signal of a moving clutter, the subclutter visibility is better than 42 db. Even with a single canceler unit (line 125), the visibility is 18 db. From FIGURE 7, it thus becomes apparent that the visibility is substantially increased by the use of more than one canceler unit.

Reference is now directed to FIGURE 8 which is one embodiment of the source of coherent frequencies 40. The source is shown comprising 13 crystal oscillators (only the first and last being shown in FIGURE 8). Each oscillator produces another of the 13 frequencies $f_1$ through $f_{13}$ which is supplied to one of phase shifters 131 through 143 which are phase locked by a signal from the TR radar system 10 (FIGURE 1). Consequently, each of the 13 frequencies is coherent or in phase with the transmitted frequency. In another embodiment the source 40, as shown in FIGURE 9, a coho crystal oscillator 145, which may be the same as the coho used in the TR radar system, is used to drive a phase shifter 150 locked by a lock signal from the TR radar system 10 so that the output of shifter 150 is a transmitter coherent signal. The latter signal is supplied to a bank 155 of 13 Doppler phase shifters which produce the desired phase shifts to provide the 13 coherent frequencies $f_1$ through $f_{13}$. The values of degrees per milliseconds indicated in FIGURE 9 are the approximate values necessary to produce frequencies varying from $f_1=30$ mc.−480 to $f_{13}=30$ mc.+480, where $f_c=30$ mc. (megacycles).

The teachings of the present invention of cancelling the effect of moving clutter to enhance the subclutter visibility of a moving target indicator radar system may be employed in a system in which the target selection is manually performed as well as in systems which are automatically controlled. For example in an automatic system with data storing capabilities, the frequency gating network 45 as well as the residue comparison and selection unit 50 may be in signal communication with such a system so that either or both units may be controlled as well as monitored by the automatic system. For example, the three frequencies needed to cancel the effect of moving clutter in a certain volume in space may be transferred to the control circuit (not shown) of the automatic system so that during a subsequent sweep of the same volume, network 45 and unit 50 may be automatically set to provide the three desired frequencies. Also threshold circuit 110 (FIGURE 1) may be selectively controlled by the automatic system to be set to predetermined threshold levels so that the number of false targets does not exceed given limits. In FIGURE 1, lines 161 through 165 represent the interconnections of network 45 to unit 50 and threshold circuit 110 with an automatic moving target indicator (MTI) radar system.

There has accordingly been shown and described herein a novel moving clutter cancelling system for tracking and cancelling the effect of moving clutter and thereby greatly increase the subclutter visibility of a moving target indicator system. In accordance with the teachings of the invention, a plurality of frequencies, coherent with a transmitted radar frequency are generated, with three of the frequencies being selectively supplied to three IF video channels. The three frequencies are automatically selected until one of the channels is provided with a frequency which is the closest to the IF video frequency of the moving clutter thereby cancelling the Doppler frequency shift produced due to its velocity. Consequently, the clutter appears substantially stationary so that moving targets can be more easily distinguished therefrom. It should be appreciated that although the invention has been described in conjunction with digital signals, such as the 8-bit codes produced by A/D encoders 35A, 35B and 35C, analog signals may be utilized in practicing the novel teachings of the invention.

It should further be appreciated that those familiar with the art may make other modifications in the arrangements without departing from the true spirit of the invention. Therefore, all such modifications and equivalents are deemed to fall within the scope of the appended claims.

What is claimed is:

1. In a moving target indicator radar system in which energy of a predetermined frequency reflected from targets is received and converted into IF video signals analyzed to indicate the relative locations of moving targets a system for distinguishing the moving targets from clutter moving at a velocity which does not exceed a predetermined value comprising:
   a source of a plurality of frequencies each related to said predetermined frequency and a different velocity value, not exceeding said predetermined value;
   first, second and third IF video signal channels each channel including a phase detector and a delay line canceler coupled to the output of the phase detector;
   means for supplying the phase detector of each of said channels with said IF video signals;
   frequency gating means for selectively supplying the phase detectors of said first, second and third channels with three of said frequencies; and
   residue comparing means responsive to the outputs of the cancelers of said channels for varying the three frequencies supplied to said phase detectors until the output of the canceler of said second channel is smaller than the outputs of the cancelers of said first and third channels.

2. The system defined in claim 1 further including means defining a plurality of range intervals, said residue comparing means including means for storing and adding the outputs of said cancelers over a predetermined number of range intervals, and means for comparing the added outputs of said cancelers and for actuating said frequency gating means in accordance with the relative amplitudes of said added outputs.

3. The system defined in claim 1 wherein said plurality of frequencies includes a preselected frequency related to substantially stationary clutter, a first group of frequencies greater than said preselected frequency in fixed increments and a second group of frequencies smaller than said preselected frequencies in fixed increments, each increment being representative of an increment of velocity of said clutter.

4. The system defined in claim 3 wherein said residue comparing means further includes means for selecting and supplying the smallest of the outputs of said delay line cancelers to output means associated with indicating said moving targets.

5. The system defined in claim 4 further including at least a second delay line canceler disposed between said means for selecting and said output means for increasing the subclutter visibility of said system.

6. A clutter cancelling system for cancelling the effect of moving clutter in a moving target indicator radar system in which energy pulses of a predetermined frequency transmitted into space are reflected by energy reflecting means including moving targets and clutter, the frequencies of the reflected energy being converted in said radar system into intermediate frequency video signals the clutter cancelling system comprising:
   first, second and third intermediate frequency video channels each channel including a phase detector responsive to said intermediate frequency video signals and a delay line canceler;
   means for generating a sequence of frequencies coherent with said predetermined frequency each frequency varying by a fixed increment from adjacent frequencies in said sequence;
   frequency gating means for selectively supplying three adjacent frequencies to the phase detectors of said video channels, the frequency supplied to the phase detector of said second channel being greater than the frequency supplied to the phase detector of said first channel by said fixed increment and smaller by said fixed increment than the frequency supplied to the phase detector of said third channel; and
   residue comparing means responsive to the residue output of the delay line cancelers of said first, second and third channels for controlling the three adjacent frequencies in said sequence supplied to the phase detectors as a function of the relative magnitudes of the outputs of said delay line cancelers.

7. The clutter cancelling system defined in claim 6 wherein the frequency increment is a function of a Doppler frequency shift produced by a predetermined clutter velocity increment, the frequency difference between the first and last frequencies in said sequence being related to substantially twice the maximum expected clutter velocity.

8. The clutter cancelling system defined in claim 7 wherein said residue comparing means includes means for combining and comparing the outputs of the cancelers of said channels over an interval of a plurality of range bins to provide one of three signals indicative of the relative magnitudes of the outputs of said cancelers.

9. The clutter cancelling system defined in claim 8 further including analog-to-digital converting means in each of said video channels for converting the output of its respective phase detector into a multidigit signal, each of said delay line cancelers including means for delaying each digit of said multidigit signal.

10. The clutter cancelling system defined in claim 8 wherein said residue comparing means further includes selecting means for selecting the smallest of the three outputs of the cancelers of said three video channels, and threshold output means responsive to said largest output for providing a moving target indicating signal when the signal supplied thereto exceeds a predetermined signal level selectively set therein.

11. The clutter cancelling system defined in claim 10 further including at least one delay line canceler disposed between said selecting means and said threshold output means for increasing the subclutter visibility of said clutter cancelling system.

No references cited.

RODNEY D. BENNETT, *Primary Examiner.*

C. L. WHITHAM, *Assistant Examiner.*